Patented Apr. 13, 1954

2,675,352

UNITED STATES PATENT OFFICE 2,675,352

OIL BASE DRILLING FLUID

Reginald D. Dawson, Glendale, Calif., assignor to Shell Development Company, San Francisco, Calif., a corporation of Delaware No Drawing. Application March 31, 1950,
Serial No. 153,290

11 Claims. (Cl. 252—8.5)

This invention relates to the drilling of oil and gas wells and pertains more particularly to the use and composition of improved oil-containing drilling fluids.

Drilling fluids or muds are generally used when drilling wells by the rotary method. These muds are usually pumped down through the drill stem of the rotary rig and around the drill bit, returning to the surface through the annular passage between the drill stem and the well casing.

Prime requisites of a satisfactory drilling fluid are that it possesses a good gel structure, preferably a substantially thixotropic gel structure and good plastering or sheath-forming characteristics. That is, it must form on the walls of the borehole a mudsheath effectively preventing any appreciable fluid loss to the formation. Any substantial loss of fluid to the formation is undesirable at any time during the drilling, being especially dangerous and objectionable when drilling through heaving formations such as shale, or when drilling into the producing zone, which may be contaminated and plugged by said fluid.

A further desirable characteristic of a drilling fluid is that it remains substantially stable after being contaminated with salt solutions such, for example, as brines entering the well. Since high bore-hole temperatures are often encountered in well drilling, it is also desirable that there be no breakdown of the drilling fluid when subjected to elevated temperatures and/or when contaminated with salts such as calcium sulfate. Many oil-base drilling fluids and water-and-oil drilling emulsions, having excellent plastering properties when made up to a light or average weight such as 72 lbs. per cu. ft. lose their plastering properties when made up to a heavy weight. In particular, it has been noted that many oil-base and emulsion drilling fluids incorporating blown asphalt and a rosin or rosin residue soap have excellent plastering properties when mixed to a weight of 72 lbs. per cu. ft. When, however, sufficient weighting materials are added to raise the weight of the fluid to 100 lbs. per cu. ft., a breakdown of the fluid often occurs accompanied by a loss in plastering properties.

It is an object of this invention to provide an improved oil-containing drilling fluid having a weight between 80 and 140 lbs. per cu. ft. and possessing excellent plastering properties.

Another object of this invention is to provide heavy oil-containing drilling fluids and emulsions which are neither impaired by high temperatures nor affected by brine contaminations to the same extent as ordinary drilling fluids.

These and other objects of this invention will be understood from the following detailed description of the invention. The term "oil-containing drilling fluid" employed herein and in the appended claims, includes water-in-oil emulsions, wherein either the aqueous or the non-aqueous fluid component may vary in proportions from one to fifty per cent of the total fluid phase, and oil-base drilling fluids having a base substantially comprising an oil, although it may be noted that these so-called pure oil-base drilling fluids normally contain, after a relatively short period of drilling, an amount of emulsified or non-emulsified water, usually formation water, rain water, water from aqueous alkali additives, etc., equal to from one to several per cent of the total fluid phase.

The present invention can be practiced by adding a polyvalent, preferably trivalent, metal soap of a high molecular weight fatty acid to heavy drilling fluids of the oil-base type or of the water-and-oil emulsion type containing another metal soap of a polynuclear carboxylic acid compound. The addition of the two metal soaps of two dissimilar acids, one soap being preferably a trivalent metal soap, to a heavy oil base drilling fluid or emulsion, yields a fluid that forms a thin, impervious mud-sheath on the borehole walls. The above oil base emulsions or fluids possess excellent plastering qualities, substantially thixotropic gel structures and exhibit little tendency to settle out when contaminated with formation brines. Heavy drilling fluids and emulsions incorporating a combination of soaps according to the present invention as emulsifying agents, stabilizing agents and/or agents for enhancing the plastering properties of the fluids, can also be used successfully in deep wells or in wells where high temperatures are encountered, as these fluids remain relatively stable at high temperatures.

The high molecular weight fatty acids whose soaps stabilize heavy oil base fluids and emulsions and enhance the plastering properties thereof, are those acids having from 12 to 30 carbon atoms, such as lauric, palmitic, stearic, oleic, acids, etc., either in purified form or in admixture, with other acids and substances, as they occur, for example, in tall oil. The preferred salt or soap of the acid is a trivalent metal soap such, for example, as the ferric soap, aluminum soap, etc.

Also present in a drilling emulsion is an emulsifying and/or stabilizing agent comprising a metal salt of a polynuclear carboxylic acid compound, which may include acids and acidic residues thereof which may be saponified, for example, rosin acids and the residues of rosin acids, or other similar carboxylic acids.

An especially effective class of compounds is known as natural wood resin residues that are obtained as a by-product in the selective refining of crude wood resin. Preferably, the source of natural wood resin residue is pine wood from which a dark-colored resinous material, known as B wood rosin, is obtained in the selective refining of crude wood rosin. The natural wood resin residues obtained from pine wood are characterized by being dark in color, having an acid number in the range from about 80 to 130, a drop melting point in the range of about 75° C. to about 125° C., and comprising from about 35 per cent to substantially 100 per cent gasoline insolubles.

A closely related class of polynuclear carboxylic acid compounds are the resin acids, of which group the rosin acids such as abietic acid, 1-pimaric acid, d-pimaric acid, sapinic acid, and mixtures of rosin acids such as occur in wood and gum rosin have proved outstanding in forming soaps for use in oil-containing drilling fluids. If desired, modified acids such as the oxidized or disproportionated acids can be used. Any of the acids may be readily disproportionated by catalytic treatment or any other process of disproportionation, and the acids may be readily oxidized by blowing them with air, preferably at an elevated temperature of about 500° C. Oil dispersible or oil soluble polyvalent metal soaps, for example magnesium abietate, are used as emulsifiers for water-in-oil emulsions.

Drilling fluids may comprise several components which commonly include a suspending component or medium, a suspended component, a plastering agent and an emulsifying and/or stabilizing agent. The suspending medium in the case of an emulsion of the present invention is formed of oil and water, and in the case of an oil-base drilling fluid oil alone is used, although small amounts (e. g., 5%) of water may be present, as started above. The oil in either case may be in the form of any suitable non-aqueous liquid such as a mineral oil, diesel oil, fuel oil, kerosene, stove oil and the like. A plastering agent such as a blown or polymerized asphalt is commonly incorporated in the emulsion to seal the porous walls of the borehole by forming a sheath of mud thereon. The blown asphalt is preferably added to the oil phase prior to emulsification, in relatively small quantities such as from 5 to 20% on the weight of the oil phase. A suspended component in the form of a weighting material is generally added in order to improve plastering to some extent and to add weight to the drilling emulsion to overcome any formation pressures encountered during drilling operations. Weighting materials commonly used are crushed oyster shells, barites, hematite, magnetite, etc. However, for the purposes of the present invention the preferred weighting materials are those finely ground or powdered weighting materials which have a greater tendency to be wetted by oil than by water. The weighting material may constitute a substantial portion by weight of the drilling emulsion, e. g., in the range of 20 to 60 per cent. In the case of drilling emulsions, 0.5 to 5% of a suitable emulsifying agent is also used, e. g., soaps of fatty acids, rosin acids, tall oil and the like. In general, excellent emulsions may be obtained with most of these soaps when about 1 per cent (by weight) of the emulsifier is used.

Heavy drilling fluids weighing from 80 to 140 lbs. per cu. ft. and prepared according to the present invention are found to have excellent plastering properties at all times, even when subjected to high temperatures or contaminated with formation salts, whereas, heavy drilling fluids, for example, heavy drilling emulsions incorporating blown asphalt and a polyvalent metal soap of rosin or rosin residue, normally break down and lose their plastering properties, especially when subjected to high temperatures or when contaminated with salts such as calcium sulfate.

For example, two water-in-oil drilling emulsions were prepared comprising oil, 20 per cent by weight of water, 1.0 per cent magnesium soap of rosin residue as an emulsifier, and blown asphalt as a plastering agent, said emulsions being weighted to 100 lbs. per cu. ft. with a suitable weighting agent. To one emulsion 0.25 per cent by weight of ferric stearate was added. This emulsion had excellent plastering properties at all times, even when contaminated with 1.5 per cent by weight of sodium sulfate and subjected to heating for 120 hours at 150° C. The other heavy emulsion, not having any ferric stearate added thereto, exhibited very poor plastering properties even at room temperatures. When a similar emulsion was stabilized with aluminum stearate inserted of ferric stearate, the emulsion retained its excellent plastering properties, stability and settling rate at normal or high temperatures and when contaminated with sulfates.

In another test two oil-in-water drilling emulsions were prepared and weighted to 124 lbs. per cu. ft., said muds comprising 27.5 per cent by weight of oil, water, blown asphalt, and 2.0 per cent by weight of a magnesium soap of rosin as an emulsifier. To one emulsion was added small percentages (up to 0.25 per cent) of ferric stearate. The viscosity, settling rate, stability and plastering properties of this emulsion were excellent at all times even when subjected to prolonged heating and when contaminated with sulfates. The emulsion not having ferric stearate added thereto exhibited considerable top settling at ordinary temperatures after being subjected to prolonged heating at 100 to 150° C. and showed some tendency to break down when contaminated with sulfates.

In a further test, two oil-base drilling fluids were prepared and weighted to 100 lbs. per cu. ft., said fluids comprising blown asphalt, a polyvalent rosin residue soap as a stabilizer, oil, and about 1 per cent of water that was added along with the soap stabilizer. One drilling fluid was further stabilized by the addition of 0.25 per cent by weight of ferric stearate and retained its excellent plastering properties and settling rate and was equal substantially in all respects to an average weight mud, i. e., one weighing 72 lbs. per cu. ft. The drilling fluid not being stabilized by ferric stearate had poor plastering properties even at normal temperatures.

An extra heavy oil base mud was prepared and weighted to 140 lbs. per cu. ft., said fluid comprising stove oil, blown asphalt, 0.25 per cent by weight of ferric stearate and the magnesium soap of a rosin residue as a stabilizer. The plastering properties of the fluid were excellent at room temperature and 275° F. under 500 p. s. i. pressure. The viscosity, gel properties and settling properties were also excellent at average and high temperatures. No appreciable change in properties was noted when the oil base fluid was contaminated with 10% by volume of brine. Although contamination with 2% calcium sulfate causes the viscosity of most oil base muds to increase, the addition of 2% calcium sulfate together with 10% brine as contaminating materials to the above-described oil base mud, did not cause any increase in its viscosity.

Data on the above-mentioned and other drilling fluids and emulsions are tabulated in the table hereinbelow:

| Fluid | Stabilizer | Filter Loss |
|---|---|---|
| 1A | R. R. | 2.10 |
| 2A | R. R. + F. S. | 0.25 |
| 3A | R. R. | 1.95 |
| 4A | R. R. + A. S. | 0.22 |
| 5A | R. R. | 2.40 |
| 6A | R. R. + F. S. | 0.21 |
| 7A | R. R. | 2.20 |
| 8A | R. R. + F. S. | 0.24 |
| 9A | R. R. | 2.70 |
| 10A | R. R. + F. S. | 0.29 |
| 11A | R. R. | 2.71 |
| 12A | R. R. + F. S. | 0.30 |
| 13A | R. R. | 2.59 |
| 14A | R. R. + F. S. | 0.29 |

SYMBOLS USED IN THE ABOVE TABLE 1A and 2A water-in-oil emulsions (100 lbs./cu. ft.)
3A and 4A water-in-oil emulsions (100 lbs./cu. ft.)
5A and 6A water-in-oil emulsions (124 lbs./cu. ft.)
7A and 8A oil base mud (100 lbs./cu ft.)
9A and 10A oil base mud (140 lbs./cu. ft.)
11A oil base mud (140 lbs./cu. ft.) contaminated with 10% brine
12A oil base mud (140 lbs./cu. ft.) contaminated with 10% brine
13A oil base mud (140 lbs./cu. ft.) contaminated with 10% brine and 2% CaSO₄
14A oil base mud (140 lbs./cu. ft.) contaminated with 10% brine and 2% CaSO₄
R. R. magnesium rosin residue soap
R. R.+F. S. magnesium rosin residue soap+ferric stearate
R. R.+A. S. magnesium rosin residue soap+aluminum stearate
Filter losses are given in c. c. per sq. cm. per hour at 275° F.

From the foregoing examples it may be seen that the plastering properties of heavy (80 to 140 lbs. per cu. ft.) oil base drilling fluids and water-in-oil drilling emulsions may be stabilized by the addition thereto of a small quantity (0.1 to 2.0 per cent by weight) of a trivalent metal soap of a high molecular weight fatty acid together with a small quantity (0.4 to 5.0 per cent by weight) of a metal soap of a polynuclear carboxylic acid compound, the latter preferably being a rosin soap or a rosin residue soap.

In another test two 100 lbs. per cu. ft. water-in-oil emulsions were prepared containing 20% water. Emulsion No. 15 contained 1% by weight of magnesium tallate as an emulsifier and stabilizer while emulsion No. 16 contained 1% by weight of a magnesium rosin residue soap and 0.25% of ferric stearate. When both emulsions were contaminated with 1.5% by weight of sodium sulfate, emulsion No. 15 broke down completely and could not be remixed after being subjected to a temperature of 150° C. for 18 hours. On the other hand, emulsion No. 16 was readily remixed and retained its plastering properties after being heated at 150° C. for 120 hours. Additionally, the contaminated emulsion No. 16 maintained a satisfactory gel and showed little or no separation after being stored at 60° F. for several days.

I claim as my invention:

1. An oil-containing drilling fluid for wells, comprising a substantial quantity of an oil, a plastering agent, a finely divided solid material dispersed in said fluid for weighting said fluid to between 80 and 140 lbs. per cu. ft., and a combination of two polyvalent metal soaps of dissimilar acids, one of said soaps being from 0.1 to 2.0% by weight of a trivalent metal soap of a high molecular weight fatty acid, the other of said soaps being from 0.4 to 5% by weight of a soap selected from the group consisting of metal soaps of resins and resin residues.

2. An oil-containing drilling fluid for wells, comprising a substantial quantity of an oil, a plastering agent, a finely divided solid material dispersed in said fluid for weighting said fluid to between 80 and 140 lbs. per cu. ft., and a combination of two metal soaps of dissimilar acids, one of said soaps being from 0.1 to 2.0% by weight of a trivalent metal soap of stearic acid and the other being from 0.4 to 5.0% by weight of the soap of a natural wood rosin residue.

3. An oil-base drilling fluid for wells, comprising a predominant quantity of oil, blown asphalt, a finely divided solid material dispersed in said fluid for weighting said fluid to between 80 and 140 lbs. per cu. ft., and a combination of two metal soaps of dissimilar acids, one of said soaps being from 0.1 to 2.0% by weight of a trivalent metal soap of stearic acid and the other being from 0.4 to 5.0% by weight of a divalent metal rosin soap.

4. A water-in-oil drilling emulsion for wells, comprising a predominant quantity of oil, blown asphalt, a finely divided solid material dispersed in said emulsion for weighting said fluid to between 80 and 140 lbs. per cu. ft., and a combination of two metal soaps of dissimilar acids, one of said soaps being from 0.1 to 2.0% by weight of a trivalent metal soap of stearic acid and the other being from 0.4 to 5.0% by weight of a polyvalent soap of a rosin residue.

5. An oil base drilling fluid for wells, comprising oil, blown asphalt, a weighting agent, and from 0.1 to 2.0 per cent by weight of a trivalent metal soap of a high molecular weight fatty acid and from 0.4 to 5.0 per cent by weight of a divalent metal soap of a rosin residue.

6. A water-in-oil drilling emulsion for wells, comprising oil, from 10 to 40 per cent by volume of water emulsified therein, blown asphalt, a weighting agent dispersed in said emulsion, from 0.1 to 2.0 per cent by weight of a trivalent metal soap of stearic acid and from 0.4 to 5.0 per cent by weight of a divalent soap of a rosin residue.

7. An oil-containing drilling fluid for wells comprising a substantial quantity of an oil, a plastering agent, a finely divided solid material dispersed in said fluid for weighting said fluid to between 80 and 140 lbs. per cu. ft., and a combination of two polyvalent metal soaps of similar acids, one of said soaps being from 0.1 to 2.0% by weight of a soap of a group consisting of ferric stearate and aluminum stearate, the other being from 0.4 to 5.0% by weight of a magnesium rosin residue soap.

8. An oil-containing drilling fluid for wells, comprising a substantial quantity of an oil, a plastering agent, a finely divided solid material dispersed in said fluid for weighting said fluid to between 80 and 140 lbs. per cu. ft., and a combination of two polyvalent metal soaps of dissimilar acids, one of said soaps being from between 0.1 to 2.0% by weight of ferric stearate, and the other being from 0.4 to 5.0% by weight of a polyvalent rosin residue soap.

9. An oil-containing drilling fluid for wells, comprising a substantial quantity of an oil, a plastering agent, a finely divided solid material dispersed in said fluid for weighting said fluid to between 80 and 140 lbs. per cu. ft., and a combination of two polyvalent metal soaps of dissimilar acids, one of said soaps being from 0.1 to 2.0% by weight of aluminum stearate, the other being from 0.4 to 5.0% by weight of a polyvalent rosin residue soap.

10. In a process of drilling wells comprising the steps of drilling the well with well-drilling tools, and circulating through the well, during said drilling, a water and oil drilling fluid which forms a filter cake on the wall of the well, the improvement comprising incorporating in said drilling fluid a combination of two polyvalent metal soaps of dissimilar acids, one of said soaps being from 0.1 to 2.0% by weight of a trivalent soap of a high molecular weight fatty acid, the other of said soaps being from 0.4 to 5.0% by weight of a divalent metal soap of a rosin residue, said soaps being present in an amount sufficient to reduce the fluid loss due to filtration through said filter cake but insufficient to increase the viscosity of said drilling fluid to such an extent that it cannot be circulated.

11. In a process of drilling wells comprising the steps of drilling the well with well-drilling tools, and circulating through the well, during said drilling, a water and oil drilling fluid which forms a filter cake on the wall of the well, the improvement comprising incorporating in said drilling fluid a combination of two polyvalent metal soaps of dissimilar acids, one of said soaps being from 0.1 to 2.0% by weight of a trivalent soap of a high molecular weight fatty acid, the other of said soaps being from 0.4 to 5.0% by weight of a divalent metal soap of a rosin residue, said soaps being present in an amount sufficient to reduce the fluid loss due to filtration through said filter cake but insufficient to increase the viscosity of said drilling fluid to such an extent that it cannot be circulated.

References Cited in the file of this patent
UNITED STATES PATENTS

| Number | Name | Date |
|---|---|---|
| 2,461,483 | Self | Feb. 8, 1949 |
| 2,497,398 | Dawson | Feb. 14, 1950 |
| 2,557,647 | Gates et al. | June 19, 1951 |